United States Patent [19]
Matsuno et al.

[11] Patent Number: 5,226,711
[45] Date of Patent: Jul. 13, 1993

[54] LIGHTING SYSTEM FOR USE IN VEHICLE CABIN

[75] Inventors: Yoshio Matsuno, Tokyo; Hitoshi Matsui, Kawasaki; Izumi Okamura, Hikone; Teruaki Shigeta; Yoshinori Tanabe, both of Osaka, all of Japan

[73] Assignees: Nissan Motor Co., Ltd., Yokohama; Matsushita Electric Industrial Co., Ltd., Osaka, both of Japan

[21] Appl. No.: 761,054

[22] Filed: Sep. 18, 1991

[30] Foreign Application Priority Data

Sep. 21, 1990 [JP] Japan ................ 2-253448

[51] Int. Cl.$^5$ .................................. B60Q 3/02
[52] U.S. Cl. .......................... 362/74; 362/75; 362/83.3
[58] Field of Search ........... 362/61, 74, 75, 80, 362/83.3, 364, 295; 315/84

[56] References Cited

U.S. PATENT DOCUMENTS

| | | |
|---|---|---|
| 2,337,794 | 12/1943 | Arenberg . |
| 2,582,738 | 1/1952 | Arenberg . |
| 2,635,681 | 4/1953 | Hiltman et al. . |
| 4,139,801 | 2/1979 | Linares . |
| 4,142,227 | 2/1979 | Aikens .................. 362/364 |
| 4,217,628 | 8/1980 | Windom . |
| 4,236,101 | 11/1980 | Luchaco . |
| 4,368,406 | 1/1983 | Kruzich et al. . |
| 4,670,819 | 6/1987 | Boerema et al. . |
| 4,695,769 | 9/1987 | Schweickardt . |
| 4,823,239 | 4/1989 | Doty ..................... 362/75 |
| 4,866,345 | 9/1989 | Kataoka . |
| 5,047,688 | 9/1991 | Alten . |
| 5,130,901 | 7/1992 | Priesemuth ............ 362/74 |
| 5,143,437 | 9/1992 | Matsuno et al. ....... 362/74 |
| 5,149,187 | 9/1992 | Matsuno et al. . |

FOREIGN PATENT DOCUMENTS

| | | |
|---|---|---|
| 342345 | 11/1989 | European Pat. Off. ...... 362/74 |
| 54-3759 | 1/1979 | Japan . |
| 57-144143 | 9/1982 | Japan ...................... 362/75 |
| 59-145638 | 1/1983 | Japan . |
| 61-193945 | 2/1985 | Japan . |
| 3-28038 | 2/1991 | Japan .................... 362/83.3 |
| 818525 | 8/1959 | United Kingdom ........ 362/75 |

OTHER PUBLICATIONS

"Report of Fundamental Research on How Guide Lamp is Seen", Lighting Society of Japan, 1984.
"Adjustment of Luminance in Living Room", Meeting of Union of Kansai Branches of Electric and Related Societies, by Sotaro Matsuda, 1966.
Lighting Handbook, pp. 42–44, 252, 253, 255, 260–261, 267, 430 and 431.
07/892,302 patent pending Asada et al.
07/761,052 patent pending Matsuno et al.
07/761,056 patent pending Matsuno et al.

*Primary Examiner*—Richard R. Cole
*Attorney, Agent, or Firm*—Lowe, Price, LeBlanc & Becker

[57] ABSTRACT

A lighting system for use in a vehicle cabin comprises four ceiling lamps arranged to a roof at its peripheral portions so as to be above a plane including an eye point of a seat occupant, a first foot lamp arranged to an instrument lower cover at its lower portion to be between the top of a front seat cushion and a floor, and a second foot lamp arranged to be adjacent to a rear seat cushion and between the bottom of a rear seat cushion and the floor. Two set mode selector switches allow selection of a lamp set mode between normal and rest modes.

9 Claims, 5 Drawing Sheets

LIGHTING SYSTEM FOR USE IN VEHICLE CABIN

BACKGROUND OF THE INVENTION

The present invention relates to a lighting system for use in a vehicle cabin.

FIG. 7 shows a known lighting system for use in a vehicle cabin. Referring to FIG. 7, a lamp 22 such as a room lamp for illuminating a cabin of an automotive vehicle 21 is generally arranged to a roof 23 at its center portion (or in the vicinity of the center portion). For providing light to seat cushions 24, 25, and floors 26, 27, etc. in the cabin, the lamp 22 is constructed in part or in its entirety by a material such as a resin having a diffuse transmission characteristic (see, for example, Japanese Utility Model First (unexamined) Publication No. 54-3759).

As a result, the roof 23 has a relatively light area at its center portion or in the vicinity of the lamp 22, and a relatively dark area at its portion distant from the lamp 22 or its peripheral portion.

On the other hand, the lamp 22, which is mounted to the roof 23 directly or indirectly through a reinforcing member, etc., often protrudes from the roof 23.

A problem faced in the known lighting system for use in a vehicle cabin is as follows:

When turning on, the lamp 22 provides light in the cabin. This light may reach eyes of a driver 29 after being reflected by a back mirror 28 as indicated by an arrow a in FIG. 7, or directly eyes of a passenger 30 as indicated by an arrow b in FIG. 7, causing glare and/or annoyance which results in difficulty of driving and discomfort. Additionally, the lamp 22 is directly visible from a follower vehicle, that is, light of the lamp 22 may directly reach eyes of a driver or a passenger in the follower vehicle as indicated by an arrow c in FIG. 7, causing glare and/or annoyance.

Thus, during night run of the vehicle 21, the lamp 22 is turned off in a general way. In that event, the full darkness may cause the driver 29 and the passenger 30, particularly, the latter, not only perception of narrowness but uneasiness in the cabin. These phenomena are also found when the passenger 30 takes a rest. Except when the passenger 30 falls into a deep sleep, it is preferable that the illuminance is not null in the cabin. This will be understood from the fact that, at night, lighting equipments in a bedroom are kept turned on in part to obtain a reduced level of illuminance (use of a night light), and not turned off in their entirety.

It is, therefore, an object of the present invention to provide a lighting system for use in a vehicle cabin which is free from glare and/or annoyance, and makes easy and calm a driver and a passenger particularly when taking a rest.

SUMMARY OF THE INVENTION

There is provided, according to the present invention, a lighting system for use in a cabin of a vehicle, the vehicle having a roof, a floor, a front seat cushion, a rear seat cushion and a seat occupant, the lighting system comprising:

a plurality of ceiling lamps arranged between the roof and a plane including an eye point of the seat occupant;

at least one first foot lamp arranged between the top of the front seat cushion and the floor, said at least one first foot lamp being disposed opposite to the front seat cushion;

at least one second foot lamp arranged between the bottom of the rear seat cushion and the floor;

means for controlling a turning-on and a turning-off of said plurality of ceiling lamps, said at least one first foot lamp and said at least one second foot lamp; and means connected to said controlling means for selecting one of lighting levels on said plurality of ceiling lamps, said at least one first foot lamp and said at least one second foot lamp.

DETAILED DESCRIPTION OF THE INVENTION

Referring to FIGS. 1 to 6, a preferred embodiment of a lighting system for use in a vehicle cabin according to the present invention will be described.

Figure 1:
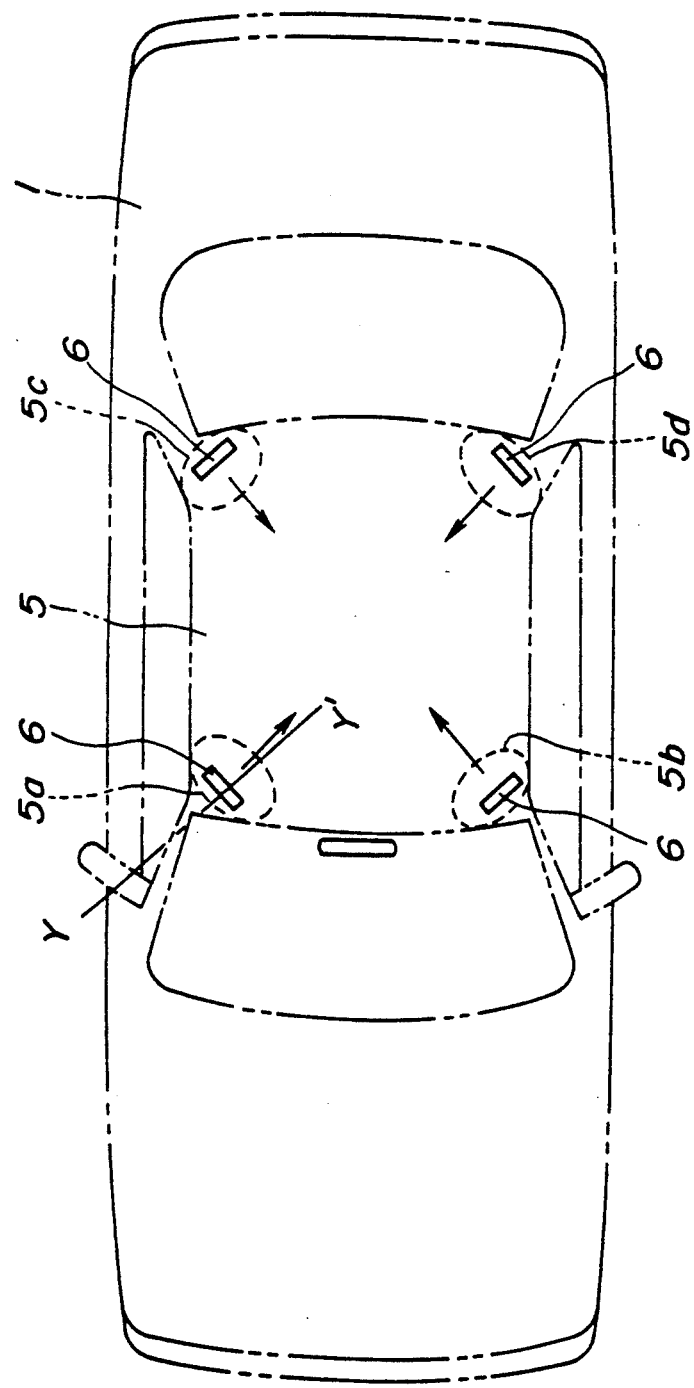
FIG. 1 is a plan view illustrating a preferred embodiment of a lighting system for use in a vehicle cabin according to the present invention.
Figure 2:
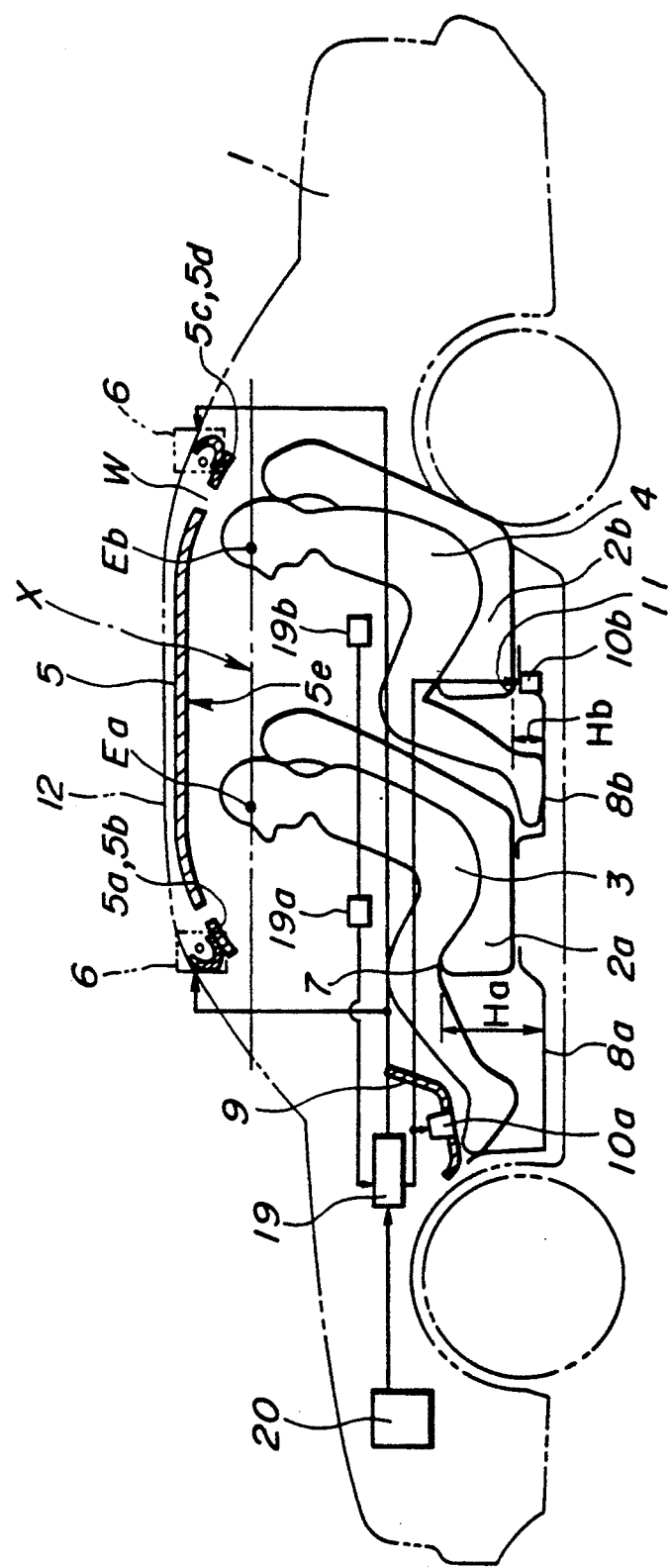
FIG. 2 is a side view illustrating the lighting system in FIG. 1, with a driver and a passenger.

Referring to FIGS. 1 and 2, in a cabin of an automotive vehicle 1, four ceiling lamps 6 are arranged to a roof 5 at its peripheral portions 5a and 5b on the side of a front seat cushion 2a, and its peripheral portions 5c and 5d on the side of a rear seat cushion 2b so as to be above a plane X including an eye point Ea of a driver 3 seated on the front seat 2a and an eye point Eb of a passenger 4 seated on the rear seat 2b.

Referring to FIG. 2, a foot lamp 10a is arranged to an instrument lower cover 9 at its lower portion, which is a vehicle component located in front of the front seat cushion 2a, to be between the top 7 of the front seat cushion 2a and a floor 8a, i.e., within Ha, while a foot lamp 10b is arranged to be adjacent to the rear seat cushion 2b and between the bottom 11 of the rear seat cushion 2b and a floor 8b, i.e., within Hb.

Figure 3:
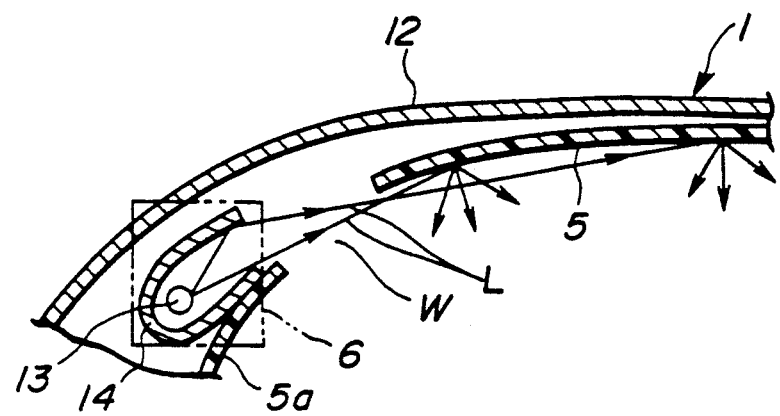
FIG. 3 is a fragmentary section illustrating a ceiling lamp arranged to a roof, taken along the line Y—Y' in FIG. 1.

FIG. 3 shows a fragmentary section illustrating one of the ceiling lamps 6 arranged to the roof 5, taken along the line Y—Y' in FIG. 1. Referring to FIG. 3, at the peripheral portion 5a of the roof 5, the ceiling lamp 6 is received in a space defined by the roof 5 and an outer roof panel 12 without protruding from the roof 5, so that a high luminance portion which corresponds to principally a bulb 13 is not visible directly from a position of each of the eye points Ea and Eb in the cabin. Similarly, at each of the other peripheral portions 5b, 5c and 5d of the roof 5, the ceiling lamp 6 is received in a space defined by the roof 5 and the outer panel 12 without protruding from the roof 5. A wide and effective use of a space in the cabin can be attained by receiving the ceiling lamps 6 in such a manner.

Referring to FIG. 3, through an opening W formed with the roof 5, light is projected to the center of the roof 5, substantially in parallel with the roof 5 as indicated by arrows L in FIG. 3. This light is diffusely reflected on the roof 5 to illuminate the entirety of the cabin of the vehicle 1, that is, it illuminates the cabin indirectly. The ceiling lamp 6 includes a reflecting plate 14 which has its function to control an orientation of light so as to illuminate the roof 5 only.

With the structure as described above, light of the ceiling lamp 6 fails to reach eyes of the driver 3 or the passenger 4, resulting in prevention of glare and/or annoyance.

Figure 4:
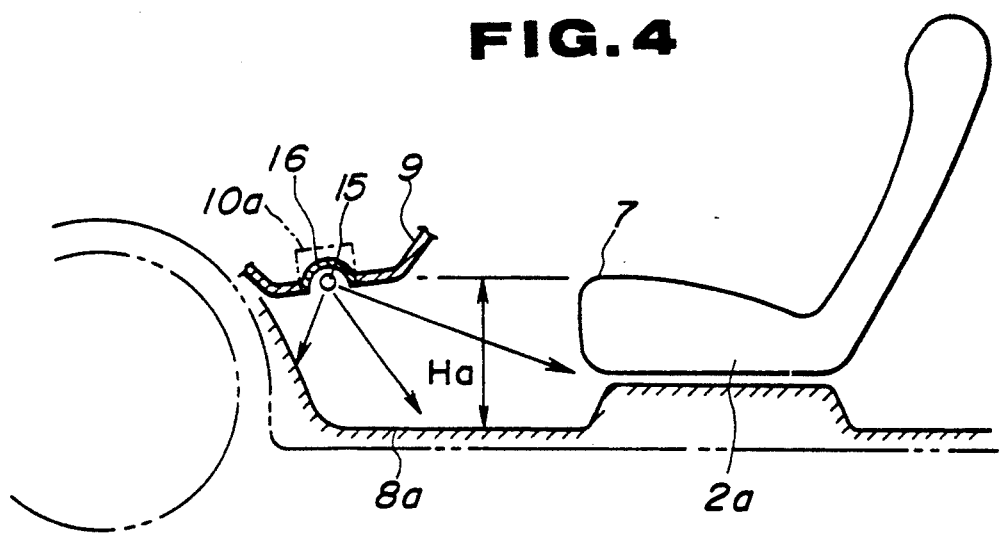
FIG. 4 is a fragmentary section illustrating a foot lamp arranged to an instrument lower panel.

FIG. 4 shows a fragmentary section illustrating the foot lamp 10a arranged to the instrument lower panel 9. The foot lamp 10a includes a bulb 15, and a reflecting plate 16. The reflecting plate 16 has its function to provide light to the front seat cushion 2a, and control an orientation of light so as to illuminate the floor 8a, and not an area above the top 7 of the front seat cushion 2a.

Figure 5:
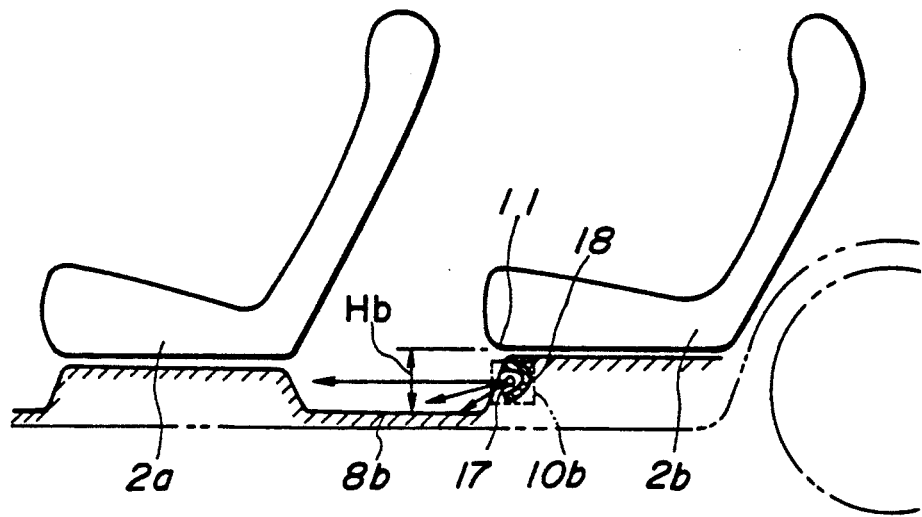
FIG. 5 is a fragmentary section illustrating a foot lamp arranged to be adjacent to a rear seat cushion.

FIG. 5 shows a fragmentary section illustrating the foot lamp 10b arranged to be adjacent to the rear seat cushion 2b. The foot lamp 10b includes a bulb 17, and a reflecting plate 18. The reflecting plate 18 has its function to provide light to the front seat cushion 2a, and control an orientation of light so as to illuminate the floor 8b, and not an area above the bottom 11 of the rear seat cushion 2b.

With the foot lamps 10a and 10b, a high-luminance portion which corresponds to principally the bulb 15 or 17 is not visible directly from the position of each of the eye points Ea and Eb in the cabin.

With the structure as described above, light of the foot lamp 10a or 10b fails to reach the eyes of the driver 3 or the passenger 4, resulting in prevention of glare and/or annoyance.

Referring again to FIG. 2, the ceiling lamps 6 and the foot lamps 10a, 10b are connected to a power supply 20 through a lighting control 19 for turning on and off the lamps 6, 10a and 10b at a desired time. The driver 3 can change, if necessary, a lighting level or set mode of the ceiling lamps 6 and the foot lamps 10a, 10b by a set mode selector switch 19a. The passenger 4 can also carry out the same operation by a set mode selector switch 19b.

Next, the operation of this embodiment will be described.

During normal run of the vehicle 1, the driver 3 or the passenger 4 establishes the set mode to "normal" by the set mode selector switch 19a or 19b. Specifically, the luminance of the roof 5 is set to be between 90 and 200 cd/m² at the peripheral portions 5a, 5b, 5c and 5d of the roof 5, and between 0.1 and 0.5 cd/m² at center portions 5e of the roof 5. Additionally, the luminance ratio of the peripheral portions 5a, 5b, 5c and 5d to the center portions 5e is set to be 10:1 or more. In that event, the illuminance of the roof 5 is determined in accordance with its material and reflectance.

Figure 6:
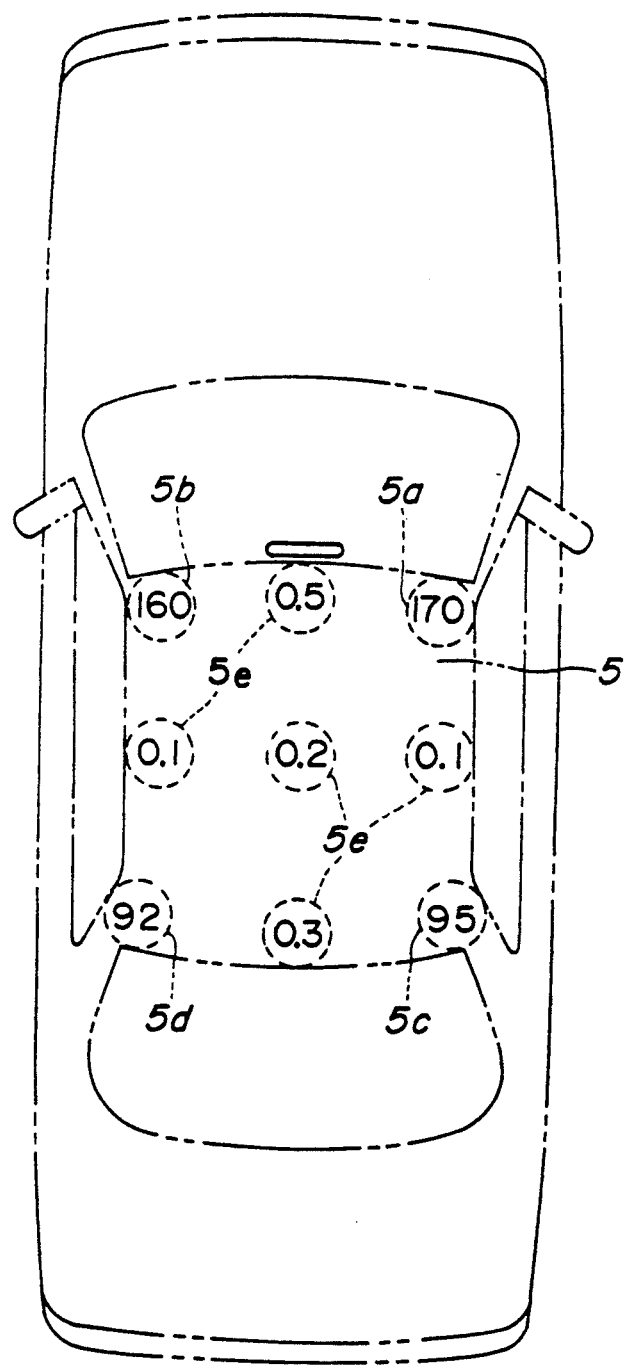
FIG. 6 is a luminance distribution characteristic of the roof obtained by the lighting system in FIG. 1.
Figure 7:
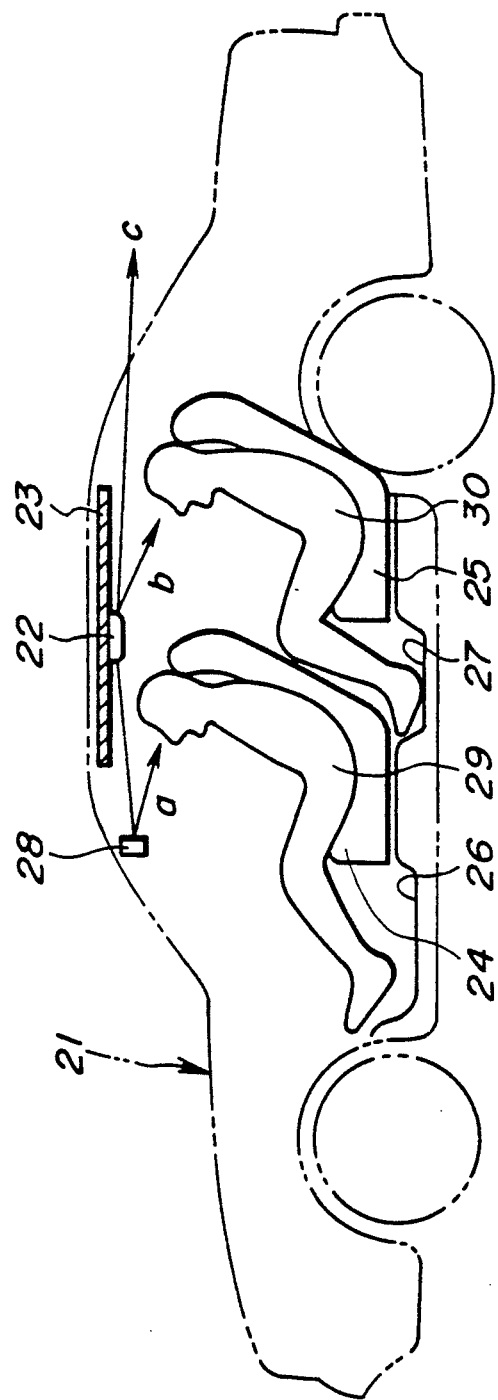
FIG. 7 is a view similar to FIG. 2, illustrating a known lighting system for use in a vehicle cabin.

FIG. 6 shows a luminance distribution characteristic of the roof 5 obtained by an experience.

The driver 3 and the passenger 4 can feel the roof 5 to be wide by arranging the ceiling lamps 6 to the roof 5 at the peripheral portions 5a, 5b, 5c and 5d so as to make lighter the peripheral portions 5a, 5b, 5c and 5d relative to the center portions 5e.

The reason of this phenomenon will be described. It is well known that, in a common house, a living space can be felt to be wide by making lighter a periphery thereof relative to a center thereof, and not by making lighter the center relative to the periphery (see Lighting Handbook, p. 267, Table 11.32 and p. 431, Table 19.12 edited by Lighting Society in Japan). Such idea can be applied to the vehicle cabin which is generally narrower than the living space in the common house so as to obtain the same effect or perception of extent in the cabin.

The reason why the luminance ratio of the peripheral portions 5a, 5b, 5c and 5d to the center portions 5e is set to be 10:1 or more will be described.

It is recommended that, in a common office, the luminance ratio of a visual object or main object to be seen on a desk to a periphery thereof is 10:1 or less, ideally, 3:1 or less (see Lighting Handbook, p. 252, Table 11.2 edited by Lighting Society in Japan). This luminance ratio may be sufficient to obtain a substantially agreeable working environment. However, in view of conditions in the vehicle cabin, the luminance ratio of 10:1 or more is allowable if the driver 3 or the passenger 4 fails to feel discomfort due to absence of visual working to be performed continuously as the office. Thus, the luminance ratio is set to be 10:1 or more in this embodiment. This results in perception of extent in the cabin in a similar manner as described above.

The reason why the luminance of the peripheral portions 5a, 5b, 5c and 5e of the roof 5 is set to be 200 cd/m² or less will be described.

When the vehicle 1 is traveling on an ordinary road at night, a desired value of the average luminance of the road is approximately between 1 and 2 cd/m² (see Lighting Handbook, p. 260, §11.4.3 edited by Lighting Society in Japan). Under these conditions, the driver 3 or the passenger 4 in the vehicle 1 adapts to the environment thereof or the brightness of a surface of the road, etc., that is, the eyes of the driver 3 or the passenger 4 get used to the brightness of the environment. When the luminance of the ceiling lamps 6, principally, the bulbs 13, is approximately 2,000 cd/m² in that state, the driver 3 or the passenger 4 feels glare and/or annoyance (see Lighting Handbook, p. 255, Table 11.19 edited by Lighting Society in Japan).

With regard to the relative relationship between the luminance Lc of a ceiling and the luminance Ll of a lighting equipment mounted thereto in a common office, the luminance ratio of Lc to Ll is, for example, approximately 1:10 (see Lighting Handbook, p. 253, Table 11.15 edited by Lighting Society in Japan). This is also applicable to the relationship between the roof 5 and the ceiling lamps 6 mounted thereto in the cabin.

It will be understood from the foregoing that the upper limit of the luminance of each of the peripheral portions 5a, 5b, 5c and 5d of the roof 5 is preferably set to: $2,000 \div 10 = 200$ cd/m².

With regard to determination of the luminance of the center portions 5e of the roof 5, the value of 0.1 cd/m² or more results from an experience for obtaining the critical value of luminance which allows perception of depth and extent of the roof 5 as shown in FIG. 6.

Next, the luminance of the foot lamp 10a for illuminating the floor 8a is set to be 2 cd/m² or less in a view range when looking at the floor 8a from the eye point Ea of the driver 3 seated on the front seat cushion 2a, i.e., in a range between the front seat cushion 2a and the instrument lower cover 9, while the luminance of the foot lamp 10b for illuminating the floor 8b is set to be 2 cd/m² or less in a view range when looking at the floor 8b from the eye point Eb of the passenger 4 seated on the rear seat cushion 2b, i.e., in a range between the rear seat cushion 2b and the front seat cushion 2a. In that event, the illuminance of each of the floors 8a and 8b is determined in accordance with its material and reflectance.

With regard to determination of the luminance of each of the foot lamps 10a and 10b, the value of 2 cd/m² or less results from adaptation of the eyes of the driver 3 or the passenger 4 in a similar manner to the ceiling lamps 6.

The driver 3 and the passenger 4 can feel the floors 8a and 8b to be wide by arranging the foot lamp 10a to the instrument lower cover 9 at its lower portion, and the foot lamp 10b to be adjacent the rear seat cushion 2b for illuminating the floors 8a and 8b.

During normal run of the vehicle 1, the driver 3 or the passenger 4 perceives the extent in the cabin in a manner as described above. In that event, the lighting level or set mode in the cabin is established to "normal".

When the driver 3 or the passenger 4 takes a rest during normal run or standstill of the vehicle 1, the driver 3 or the passenger 4 establishes the set mode to "rest" by the set mode selector switch 19a or 19b. Specifically, the luminance of the roof 5 is set to be 2 cd/m² or less at the peripheral portions 5a, 5b, 5c and 5d of the roof 5, and 0.001 cd/m² or more at the center portions 5e of the roof 5, reducing the lighting level relative to "normal" mode, respectively. Additionally, the luminance ratio of the peripheral portions 5a, 5b, 5c and 5d to the center portions 5e is set to be 10:1 or more. In that event, the illuminance of the roof 5 is determined in accordance with its material and reflectance.

Similarly, the luminance of the foot lamp 10a for illuminating the floor 8a is set to be between 0.01 and 0.05 cd/m² in the view range when looking at the floor 8a from the eye point Ea of the driver 3 seated on the front seat cushion 2a, i.e., in the range between the front seat cushion 2a and the instrument lower cover 9, while the luminance of the foot lamp 10b for illuminating the floor 8b is set to be between 0.01 and 0.05 cd/m² in the view range when looking at the floor 8b from the eye point Eb of the passenger 4 seated on the rear seat cushion 2b, i.e., in the range between the rear seat cushion 2b and the front seat cushion 2a. In that event, the illuminance of each of the floors 8a and 8b is determined in accordance with its material and reflectance.

The reason why the luminances of the ceiling lamps 6 and the foot lamps 10a, 10b are set to the above values in "rest" mode will be described.

When identifying and recognizing shape and color of an object, each eye adjusts its lens function to obtain an image at the center of an orbit positioned on a retina and having concentrated conical cells, which operates upon minute observation. It is generally known that the conical cells are low in sensibility, and merely responsive to a light object. The eyes have a high sensibility in a dark environment, and are responsive to an object having luminance of 0.001 cd/m² or more in that event. On the other hand, the eyes have a low sensibility in a light environment, and are merely responsive to an object having higher luminance (see Lighting Handbook, p. 42, §3.4 edited by Lighting Society in Japan). Thus, the eyes are generally focused on a lighter object without trying to watch the other one consciously.

Under these lighting conditions and during a rest, the driver 3 or the passenger 4 fails to try to watch an object consciously, and is nearly in a sleeping state in a word. Accordingly, in view of the lighting level in the cabin which is slightly variable in accordance with a lighting state of the environment of the vehicle 1, the lighting level in "rest" mode may be about one hundredth (1/100) of that one in "normal" mode so as to obtain the brightness which allows somehow perception of extent on the roof 5, and the shape of an object on the floors 8a and 8b.

Even when the driver 3 or the passenger 4 takes a rest, the ceiling lamps 6 and the foot lamps 10a, 10b are turned on with a reduced lighting level in such a manner. Accordingly, the full darkness which may cause the driver 3 or the passenger 4 uneasiness in the cabin can be avoided, resulting in provision of easiness and calmness to the driver 3 or the passenger 4.

In the aforementioned embodiment, when taking a rest during normal run or standstill of the vehicle 1, the driver 3 or the passenger 4 manually operates the set mode selector switch 19a or 19b to change the set mode from "normal" to "rest", thus obtaining reduced lighting levels of the ceiling lamps 6 and the foot lamps 10a, 10b relative to the normal lighting levels. Alternatively, a signal from a sensor, etc. may be used to change the set mode from "normal" to "rest", and vice versa.

What is claimed is:

1. A lighting system for use in a cabin of a vehicle, the vehicle including a roof having a center portion, a floor, a front seat cushion having a top and forward surface, a rear seat cushion having a bottom and a seat occupant, the lighting system comprising:
    a plurality of ceiling lamps arranged between the roof and plane including an eye point of the seat occupant;
    means for reflecting light from said plurality of ceiling lamps in an upwards direction and towards the center portion of the roof;
    at least one first foot lamp arranged between the top of the front seat cushion and the floor, said at least one first foot lamp being disposed opposite to the forward surface the front seat cushion;
    at least one second foot lamp arranged between the bottom of the rear seat cushion and the floor;
    means for controlling a turning-on and a turning-off of said plurality of ceiling lamps, said at least one first foot lamp and said at least one second foot lamp; and
    said lighting system being able to be set in a plurality of lighting levels when turned on and having means connected to said controlling means for selecting one of said lighting levels of said plurality of ceiling lamps, said at least one first foot lamp and said at least one second foot lamp.

2. A lighting system as claimed in claim 1, wherein said plurality of ceiling lamps are mounted to the roof at peripheral portions thereof.

3. A lighting system as claimed in claim 2, wherein said plurality of ceiling lamps are received in a space defined by the roof and an outer roof panel.

4. A lighting system as claimed in claim 1, wherein said plurality of ceiling lamps are arranged in the vicinity of the roof.

5. A lighting system as claimed in claim 1, wherein said at least one first foot lamp is mounted to an instrument lower cover.

6. A lighting system as claimed in claim 1, wherein said at least one second foot lamp is disposed adjacent to the rear seat cushion.

7. A lighting system as claimed in claim 1, wherein said selecting means include two set mode selector switches.

8. A lighting system as claimed in claim 7, wherein said two set mode selector switches allow selection between a normal mode and a rest mode.

9. A lighting system as claimed in claim 1, wherein said means for reflecting light include a reflecting plate.

* * * * *